Sept. 23, 1958 V. H. STOUT 2,853,344
WHEEL BALANCING HUB CAP
Filed July 9, 1956 2 Sheets-Sheet 1
Fig. 1
Fig. 2
Fig. 3
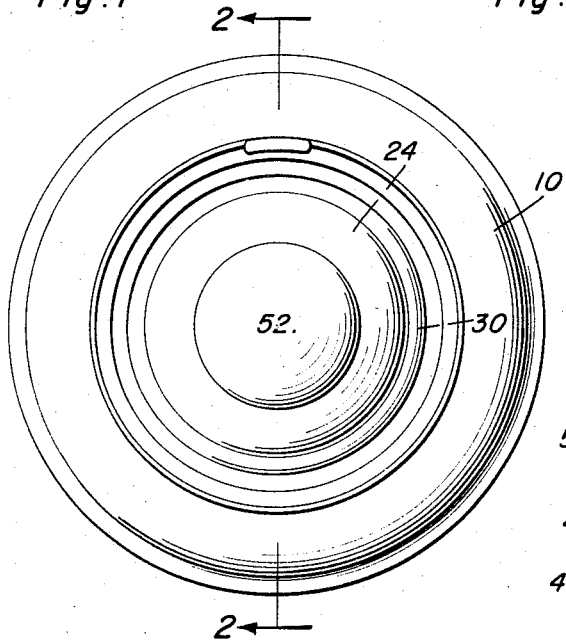
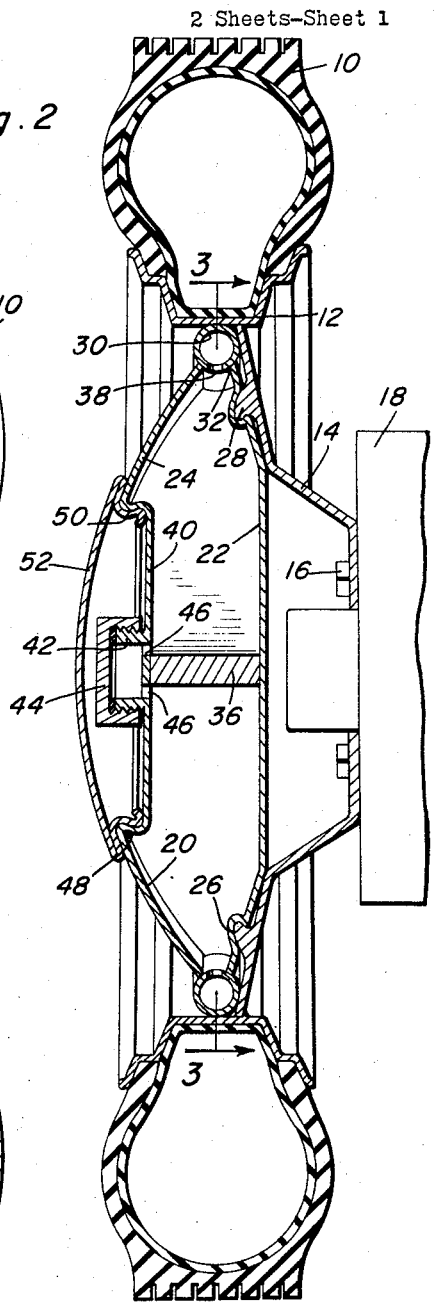
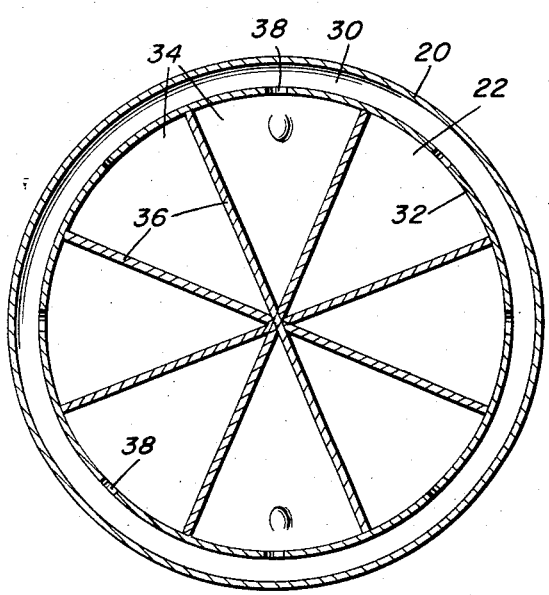
Vincent H. Stout
INVENTOR.

Sept. 23, 1958 V. H. STOUT 2,853,344
WHEEL BALANCING HUB CAP
Filed July 9, 1956 2 Sheets-Sheet 2

Vincent H. Stout
INVENTOR.

BY *Clarence A. O'Brien*
*and Harvey B. Jacobson*
Attorneys

United States Patent Office 2,853,344
Patented Sept. 23, 1958

2,853,344

WHEEL BALANCING HUB CAP

Vincent H. Stout, Powell, Wyo.

Application July 9, 1956, Serial No. 596,649

3 Claims. (Cl. 301—5)

This invention comprises novel and useful improvements in a wheel balancing hub cap and more specifically relates to a balancing device for automobile wheels adapted to be detachably secured to a wheel at the hub portion of the same.

The primary object of this invention is to provide a wheel balancing device which may with facility be applied to or removed from a conventional automobile wheel and which will automatically compensate for any out of balance of the wheel.

A further object of the invention is to provide a wheel balance in accordance with the preceding object which may take the place of or be utilized as a hub cap for an automobile wheel.

A further object of the invention is to provide a wheel balancing device in which the balancing element shall consist of a fluid, either liquid or metallic, whereby the weight of the same may be readily distributed under the influence of centrifugal force to balance vibrations of a wheel.

A still further important object of the invention is to provide a balancing device in accordance with the foregoing objects in which the fluid balancing medium of the device shall remain non-frozen at all ambient temperatures encountered by automotive vehicles.

Yet another object of the invention is to provide a balancing device as set forth in the preceding objects in which a toroidal balancing chamber shall be disposed immediately adjacent the rim of an automobile wheel in order to obtain the maximum benefits of centrifugal force, and whereby a plurality of chambers constituting storage means for the fluid balancing means shall be disposed radially inwardly of the balancing chamber and shall have free communication therewith.

Yet another object of the invention is to provide a balancing device in compliance with the above-mentioned objects which shall have a compact and improved construction, and shall be capable of being completely received within the rim of a conventional automobile wheel and yet whereby access may be readily had to the storage chamber means of the device for replenishing the weighting fluid therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing a conventional automobile wheel having one embodiment of a balancing device incorporating therein the principles of this invention applied thereto;

Figure 2 is a vertical sectional view taken upon an enlarged scale substantially upon the plane indicated by the section line 2—2 of Figure 1 and illustrating in particular the manner in which the balancing device is associated with the hub portion of a wheel;

Figure 3 is a detailed view taken substantially upon the plane indicated by the section line 3—3 of Figure 2 and showing the relative construction and arrangement of the peripheral balancing chamber and of the centrally disposed storage means of the device;

Figure 4:
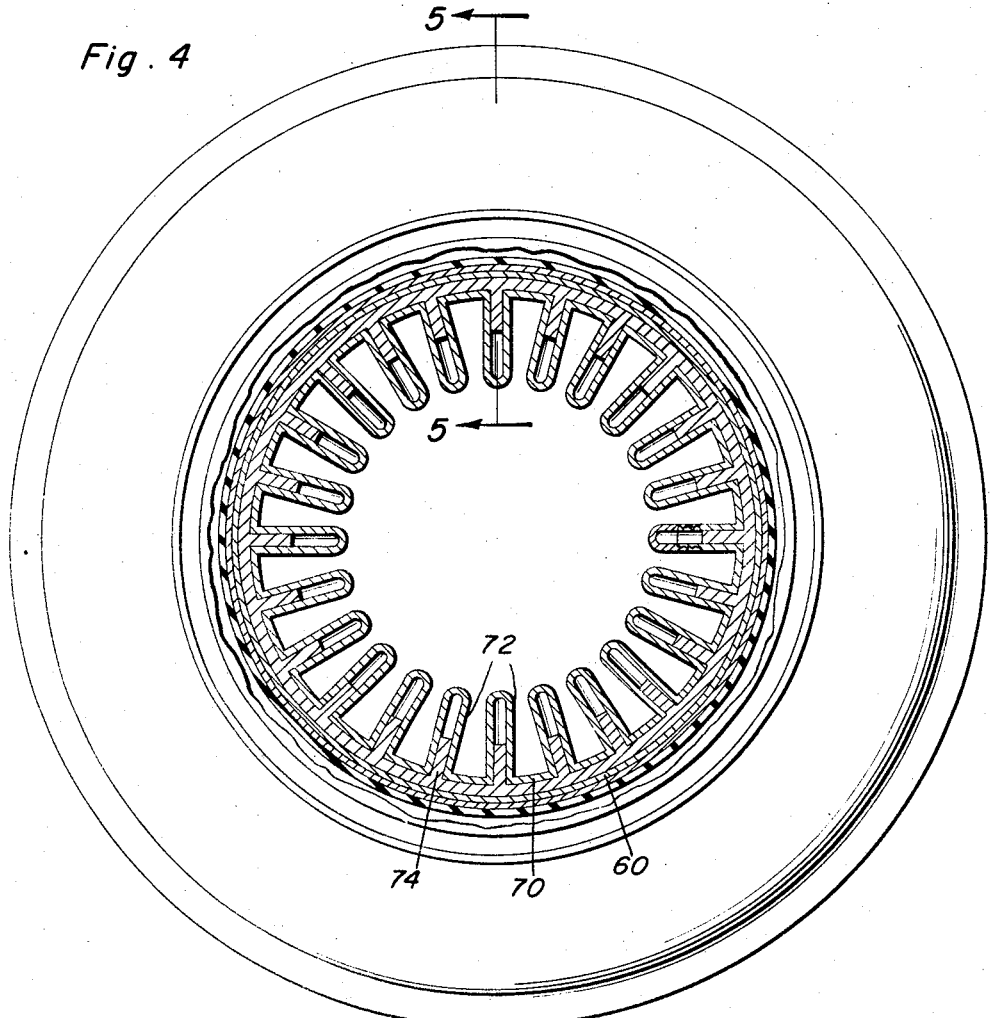
Figure 4 is a view of a second embodiment in accordance with this invention, an automobile wheel being shown in elevation and the interior construction of the device being illustrated in vertical section; and, Figure 5 is a detailed view taken substantially upon the plane indicated by the section line 5—5 of Figure 4 and illustrating certain structural details of this embodiment.

In accordance with the principles of this invention there is provided a wheel balancing device, which may be compactly disposed as a hub cap of a conventional automobile wheel, and which the balancing medium of the device consists of a fluid such as a non-freezing liquid or a liquid metal, and whereby the effects of centrifugal force are utilized for positioning the fluid balancing means in such a manner as to compensate for and correct any out of balance of the automobile wheel.

It has been found that when a wheel is out of balance, the centrifugal forces acting at the heaviest point of the wheel are greater than the other locations thereon. The present invention utilizes the effects of centrifugal force due to the rotation of a wheel to displace the fluid weighting means of this invention whereby to equalize and compensate for the out of balance of the wheel which acts as a weight concentrated at a particular location upon the wheel.

Referring first to the embodiment disclosed in Figures 1–3 of the drawings, it will be seen that any suitable form of automobile tire 10 is mounted upon a rim 12 carried by a flange constituting the hub portion 14 of a wheel, the latter being detachably secured in a conventional manner as by fastening lugs or bolts 16 to the drum 18 carried by the axle of the automotive vehicle. In accordance with this invention, the usual or conventional hub cap is removed and the balancing device to be now described is detachably mounted within the central opening lying within the inner periphery of the rim 12 by a detachable connection with the hub 14. This balancing device constitutes a replacement for and a new hub cap for the wheel hub.

Conveniently, the device consists of a hollow, generally lenticular metallic body 20 having a rear wall 22 which is generally flat, and an outwardly convex front wall 24. Preferably the rear wall is provided with an inwardly recessed or inwardly dished channel or groove 26 which is detachably frictionally engaged upon the annular hub retaining rib 28 with which the conventional hub 14 is provided. Thus, the lenticular body 20 may be readily inserted into or removed from the annular space within the rim 12, and may be snapped on or released from the rib 28 as desired.

As will be best apparent from a comparison of Figures 2 and 3, the hollow body includes a toroidal or ring-like preferably continuous chamber 30 which constitutes a balancer chamber for the device as set forth hereinafter. This chamber is of such size that it may be snugly received within the rim 12 whereby the maximum possible diameter of the balancer chamber is thus obtained. The hollow interior of the body lying within the inner peripheral wall of the balancer chamber 30, this wall being designated by the numeral 32, comprises a storage means for the weighting fluid.

This storage means preferably comprises a plurality of circumferentially disposed radially extending sector-like chambers 34 which are defined by radially extending partitions 36 which are joined at the axis or center of the hollow body and along the axis of rotation of the hub and wheel. The wall 32 which separates the storage means from the balancing chamber is provided with a plurality of openings or apertures 38 whereby free communication is established between the balancing chamber and the plurality of chambers constituting the storage means.

Referring next to Figure 2, it will be seen that the convex front wall of the body has a circular axial flat recessed wall portion 40 from which projects outwardly an axially positioned exteriorly threaded filling neck 42. A cap or closure member 44 is removably secured upon the filling neck whereby the fluid medium constituting the weighting fluid of the balancing device may be supplied to or removed from the body. Each of the compartments or chambers 34 of the storage means is provided with a passage or port 46 which extends through the wall 40 into the filling neck 42 to establish communication between the various compartments or chambers of the storage means at the axis of rotation of the same.

Surrounding the recessed wall portion 40 is an inturned annular lip 48 which receives an annular channel retaining flange 50 of a convex cover member 52. The latter thus covers and protects the filling closure 44 and may be applied to the body with a snap engagement or may be readily removed therefrom.

Various weighting fluids may be employed as the balancing agent of this invention. Especially contemplated as satisfactory for the purpose of this invention are such non-freezing liquids as oil, anti-freeze liquids, calcium chloride, and the like. With the storage means of the body provided with a quantity of the weighting medium, and the body then engaged in a wheel hub in the manner shown in Figure 2, the device is ready for operation. As the wheel rotates, under the effects of centrifugal force, fluid is displaced from the compartments or chambers of the storage means through the passages 38 into the toroidal balancing chamber, and the radial vibrations of an out of balanced wheel produce a corresponding shifting under centrifugal force of the weighting medium to thereby dispose the latter in such manner as to balance the vibrations of the wheel. In this way, out of balance conditions of tires and wheels, whether new or worn, may be readily compensated, and this arrangement may be employed either alone or in conjunction with the mechanically attached balancing weights heretofore employed for balancing wheels and tires.

Figure 5:
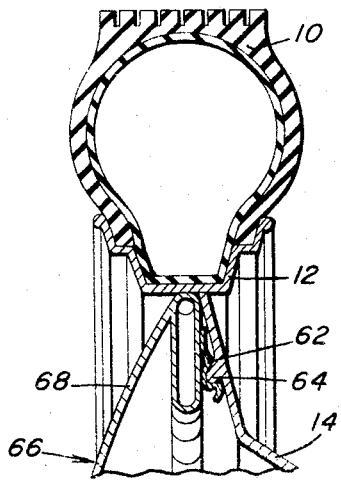

Reference is now made more particularly to Figures 4 and 5 which show a modified construction incorporating therein the principles of the invention. In this form of the invention, the same numerals have been applied to identical parts with those of the preceding embodiment. However, in this embodiment, the toroidal balancing chamber indicated by the numeral 60, is attached as by resilient fasteners 62 to an annular rib or to projections 64 by which the conventional hub cap is secured to the hub of the wheel. The hollow body designated generally by the numeral 66 includes a convex front wall 68 similar to the wall 24 previously described. The chamber 60 has a peripheral inner wall 70 from which extend a plurality of radially inwardly extending closed tubes 72 constituting pockets or spoke-like projections and which communicate freely with the interior of the chamber 60. A fluid weighting medium such as a liquid metal including mercury 74 is disposed in the storage means formed by the plurality of tubes or pockets 72 and in the balancing chamber 60. The operation of this form of the invention is substantially identical with that previously described, the centrifugal effects of the unbalanced wheel serving to displace the mercury from the pocket 72 into the peripherally disposed balancing chamber 60.

In this embodiment, it will be understood that mercury may be added to or removed from the storage means and/or the balancing chamber in any desired manner.

The principles of the invention, as set forth hereinbefore may be employed in wheels and rotating objects of various characters and are not necessarily limited to automobile wheels. Also, the balancing liquid will automatically seek different levels at various points of unbalance around the axis of rotation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A balancer for automobile wheels comprising a body, said body constituting a hub cap for said wheels, means mounting said body upon a wheel for rotation about the axis of the wheel, a fluid weighting means in said body, said body having a balancing chamber at the periphery of said body and storage means disposed radially inwardly of said balancing chamber, passage means communicating the storage means with the balancing chamber whereby the fluid weighting means, during rotation of the body will be urged into the balancing chamber under a centrifugal force proportional to the speed of rotation of the wheel and body, said storage means comprising a plurality of chambers extending radially of said axis and disposed circumferentially thereabout.

2. A balancer for automobile wheels comprising a body, said body constituting a hub cap for said wheels, means mounting said body upon a wheel for rotation about the axis of the wheel, a fluid weighting means in said body, said body having a balancing chamber at the periphery of said body and storage means disposed radially inwardly of said balancing chamber, passage means communicating the storage means with the balancing chamber whereby the fluid weighting means, during rotation of the body will be urged into the balancing chamber under a centrifugal force proportional to the speed of rotation of the wheel and body, said storage means comprising a plurality of chambers extending radially of said axis and disposed circumferentially thereabout, said chambers being defined by radial partitions in the hollow interior of said body.

3. A balancer for automobile wheels comprising a body, said body constituting a hub cap for said wheels, means mounting said body upon a wheel for rotation about the axis of the wheel, a fluid weighting means in said body, said body having a balancing chamber at the periphery of said body and storage means disposed radially inwardly of said balancing chamber, passage means communicating the storage means with the balancing chamber whereby the fluid weighting means, during rotation of the body will be urged into the balancing chamber under a centrifugal force proportional to the speed of rotation of the wheel and body, said storage means comprising a plurality of chambers extending radially of said axis and disposed circumferentially thereabout, said chambers being defined by pockets opening radially inwardly of the body from said balancing chamber.

References Cited in the file of this patent

UNITED STATES PATENTS

| | | |
|---|---|---|
| 2,461,643 | Hemmeter | Feb. 15, 1949 |
| 2,687,918 | Bell | Aug. 31, 1954 |